Nov. 26, 1968 A. J. SUTTON 3,413,456

QUARTER SQUARE MULTIPLIER

Filed July 20, 1965 2 Sheets-Sheet 1

INVENTOR
ALAN JOHN SUTTON

BY Hurvitz & Rose

ATTORNEYS

Nov. 26, 1968

A. J. SUTTON 3,413,456

QUARTER SQUARE MULTIPLIER

Filed July 20, 1965

2 Sheets-Sheet 2

INVENTOR
ALAN JOHN SUTTON

BY Hurvitz & Rose

ATTORNEYS

1

3,413,456

QUARTER SQUARE MULTIPLIER

Alan John Sutton, Frimley, Aldershot, England, assignor to The Solartron Electronic Group Limited Filed July 20, 1965, Ser. No. 473,308
23 Claims. (Cl. 235—194)

The present invention relates to analogue function generators for use in analogue computers and concerns function generators employing semi-conductor diodes. More particularly, the present invention relates to analogue function generators capable of receiving a plurality of input signals and providing an output signal proportional to a predetermined function of the input signals.

An analogue function generator is a circuit that accepts one or more time variant input signals and produces one or more output signals which are accurately defined non-linear functions of the input signals. A function generator whose output is a function of the sum or difference of two input variables may be called a two-input function generator. Furthermore, with respect to the regions into which a plane is divided by the intersection of a set of Cartesian axes, a function generator in which either of two input variables may have either sign is called a four-quadrant function generator. Clearly, a four-quadrant generator is necessary for the solution of many problems by an analogue computer.

A common problem in analogue computation is the multiplication of one variable $x$ by a second variable $y$ to obtain the product $xy$. One method of doing this is by the use of a quarter square multiplier in which two function generators, set up to give parabolic or square-law transfer functions within the permited latitude and working range, and two summing amplifiers are combined such that the inputs $x$ and $y$ are manipulated to give $(x+y)^2$ and $(x-y)^2$ and one quarter of $(x-y)^2$ is subtracted from one quarter of $(x+y)^2$ to give the product $xy$.

Many arrangements have been proposed for the square-law generator, but the only one in common use is the "broken-line" generator. This is based upon the concept of a straight line approximation to a non-linear function and this may be achieved by the use of a reasonable number of circuits incorporating diodes employed only as switches. By combining a number of such diode circuits it is possible to generate non-linear functions with almost any desirable relation between input and output voltages, of which the square-law relationship is one example.

In designing a function generator, having a square-law response, for example, two parameters have to be set for each diode circuit, these are the voltage at the break-point (a point joining two of the linear segments from which the parabola is approximated) and the slope of the segment, that is the conductance of the circuit.

The object of the present invention is to provide a relatively cheap diode circuit for a two-input analogue function generator having fewer sources of error than has heretofore been possible.

It is a further object to provide a diode circuit in which the input impedance seen at either input terminal is substantially constant.

Another object is to provide a circuit in which the same input terminals and input resistors can be used for operation in all four quadrants.

According to the present invention there is provided a circuit for an analogue function generator comprising two input terminals connected through associated input resistors to a junction point which is connected to a source of reference potential through a first pair of semi-conductor diodes connected in series with their cathodes together, the cathodes of the diodes being connected to a first output terminal through a semi-conductor diode and, through a third resistor, to a source of negative potential, the said junction point being further connected to the source of reference potential through a second pair of semi-conductor diodes connected in series with their anodes together, the anodes of the second pair of diodes being connected to a second output terminal through a semi-conductor diode and, through a fourth resistor, to a source of positive potential.

2

The above and still further objects, features and advantages of the invention will become apparent upon consideration of the following detailed description of a specific embodiment of the invention, especially when taken in conjunction with the accompanying drawings, wherein.

In the several figures of the drawings, like parts are given like references.

Figure 1:
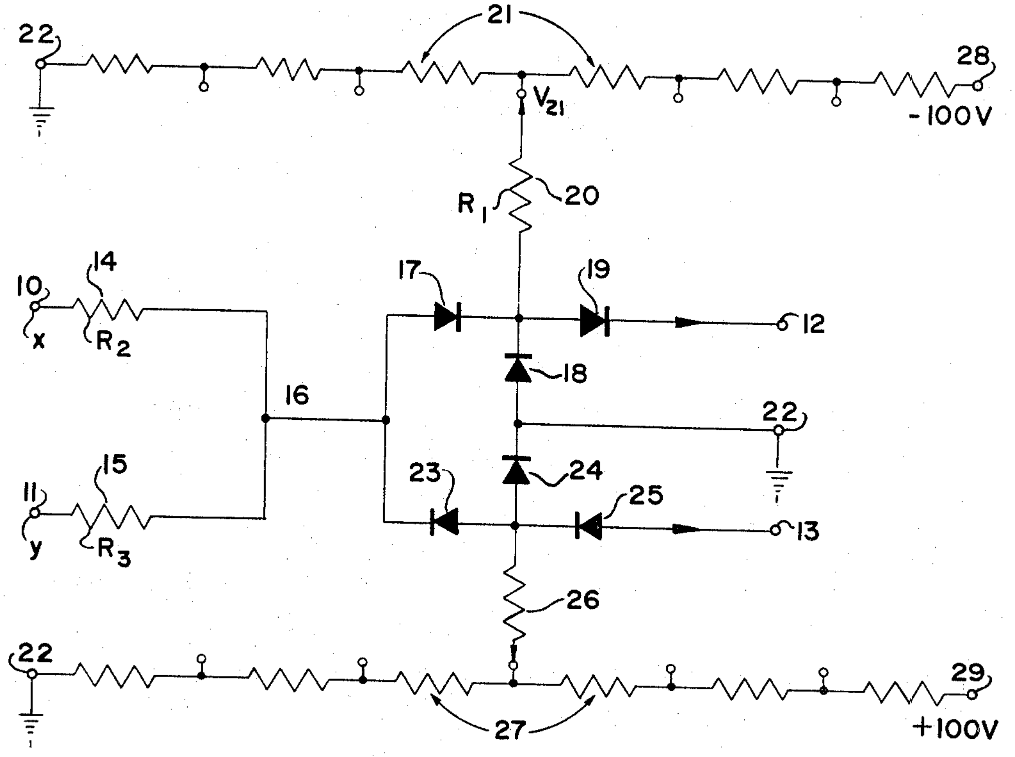
FIGURE 1 is a schematic circuit diagram of a gating circuit for use in an analogue function generator.

In FIGURE 1 there is shown a gating circuit having input terminals 10 and 11 and output terminals 12 and 13. The input terminals 10 and 11 are connected through associated input resistors 14 and 15 to a junction point 16 which is connected to the anode of a diode 17. The cathode of the diode 17 is connected to the cathode of a diode 18 which has its anode connected to a source of reference potential, for example ground, through the terminal 22. The junction between the diodes 17 and 18 is connected to the anode of a diode 19 which has its cathode connected to the output terminal 12. The junction between the diodes 17 and 18 is further connected to a resistor 20 which has its remote end connected to a movable tap on a potential divider chain 21. The junction point 16 is also connected to the cathode of a diode 23. The anode of the diode 23 is connected to the anode of a diode 24 which has its cathode connected to the terminal 22. The junction between the diodes 23 and 24 is connected to the cathode of a diode 25 which has its anode connected to the output terminal 13. The junction between the diodes 23 and 24 is further connected to a resistor 26 which has its remote end connected to a movable tap on a potential divider chain 27. One end of the potential divider 21 is connected to ground through terminal 22 and the other end 28 is connected to a source of negative potential, for example −100 volts, so that the potential at the remote end of the resistor 20 is always negative with respect to ground. One end of the potential divider 27 is connected to earth through terminal 22 and the other end 29 is connected to a source of positive potential, for example +100 volts, so that the potential at the remote end of the resistor 26 is always positive with respect to ground.

Figure 2:
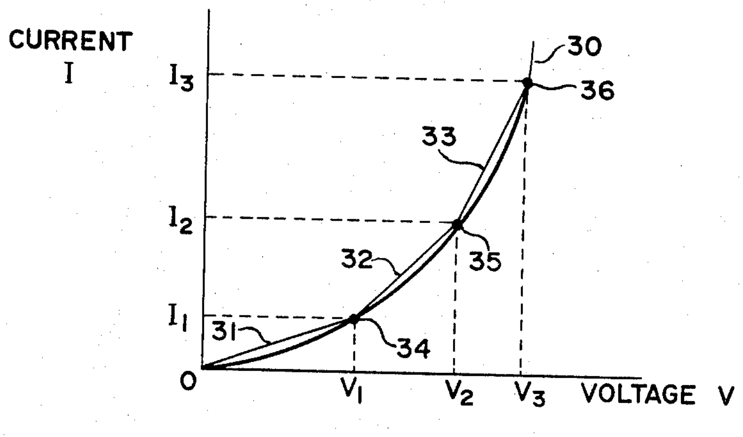
FIGURE 2 is a current/voltage characteristic of a square-law function generator utilizing circuits such as illustrated in FIGURE 1.

FIGURE 2 illustrates the process of building up a non-linear characteristic 30 by the addition of three straightline segments 31, 32 and 33. In the drawing output current (I) is plotted along the ordinate and input voltage (V) is plotted along the abscissa. The points 34, 35 and 36 joining the linear segments are known as break-points. Thus to obtain the characteristic shown, a function generator would require three separate circuits such that as the voltage V was increased from zero to a value $V_1$ the current would increase from zero to value $I_1$, the conductance being given by the slope of the segment 31. At the break-point 34 a second circuit would begin to conduct and as the voltage V was increased from a value $V_1$ to a value $V_2$ the current taken by the two circuits would increase from a value $I_1$ to a value $I_2$, the combined conductance being given by the slope of the segment 32. At the break-point 35 a third circuit would begin to conduct and as the voltage V was increased from a value $V_2$ to a value $V_3$, the current taken by the three circuits would increase from a value $I_2$ to a value $I_3$, the combined conductance being given by the slope of the segment 33.

Referring again to FIGURE 1, in operation, if an input votlage $x$ is applied to the terminal 10 and an input voltage $y$ is applied to the terminal 11 it will be seen that for positive values of the sum $(x+y)$ the circuit comprising the diodes 17, 18 and 19, the resistor 20 and the potential divider 21 will be operative, and for negative values of the sum $(x+y)$ the circuit comprising the diodes 23, 24 and 25, the resistor 26 and the potential divider 27 will be operative.

It will be seen that in the absence of a signal to the terminals 10 and 11 the potential at the junction of the diodes 17 and 18 will be slightly negative and equal to the voltage drop across the diode 18 due to the standing current through the diode 18 and the resistor 20. Similarly the potential at the junction of the diodes 23 and 24 will be slightly positive and equal to the voltage drop across the diodes 24 due to the standing current through the diode 24 and the resistor 26. Thus in the absence of an input signal, the junction point 16 is maintained substantially at earth potential and the diodes 19 and 25 are both back biased so that there is no current flow to the output terminals 12 and 13 which are connected to virtual ground.

If a small positive voltage $x$ is applied to the terminal 10 and its amplitude increased, the diode 17 will begin to conduct, and the diode 18 will stop conducting when the product of the input voltage $x$ and the resistance $(R_1)$ of the resistor 20 becomes greater than the product of the voltage $(V_{21})$ at the remote end of the resistor 20 and the resistance $(R_2)$ of the resistor 14. Thus when the product $xR_1$ becomes greater than the product $V_{21}R_2$, an output dependent upon the value of the voltage $x$ will appear at the terminal 12.

Thus the condition for the break-point (neglecting the small voltage drops across the diodes) is when the algebraic sum of the currents to the left of the terminal 12 is zero, that is when $$\frac{x}{R_2}-\frac{V_{21}}{R_1}=0$$

Taking into consideration the input voltage $y$ applied to the terminal 11, the condition for the break-point is $$\frac{x}{R_2}+\frac{y}{R_3}-\frac{V_{21}}{R_1}=0$$

where $R_3$ is the resistance of the resistor 15.

The break-point for the circuit comprising the diodes 23, 24, 25 and the resistor 26 is obtained in a similar manner.

To obtain the characteristics described with reference to FIGURE 2 a number of circuits, for example three in FIGURE 2, such as the one described with reference to FIGURE 1 would be required. Such a circuit arrangement is shown diagrammatically in FIGURE 3. A plurality of gating circuits 37, 38 and 39, each being as shown in FIGURE 1, are arranged in parallel. The input voltage $x$ is connected to a common input terminal 40 which is connected to the input terminals 10, 10' and 10'' of the gating circuits 37–39. Similarly, the input voltage $y$ is connected to a common input terminal 41 which is connected to the input terminals 11, 11' and 11'' of the gating circuits 37–39. The output terminals 12, 12' and 12'' of the gating circuits 37–39 are connected to the summing junction of a first operational amplifier 42, the summed output signal appearing at a terminal 43. Similarly, the output terminals 13, 13' and 13'' are connected to the summing junction of a second operational amplifier 44, the summed output signal appearing at a terminal 45.

The break-points may be determined in the manner previously described and the slope of each of the gating circuits 37–39 is determined by the conditions in the region where the input voltage is more positive than the break-point for positive values of the sum of the input voltages. In this region the diode 19 is conducting, and the first operational amplifier 42 has a high internal gain (of the order of $10^7$) which ensures that an incremental output voltage $(dz)$ is given approximately by $$\frac{dz}{Ro}+\frac{dx}{R_2}+\frac{dy}{R_3}=0$$

where $Ro$ is the shunt resistance of the first operational amplifier 42, and $dx$ and $dy$ are the incremental values on the input voltages.

Figure 3:
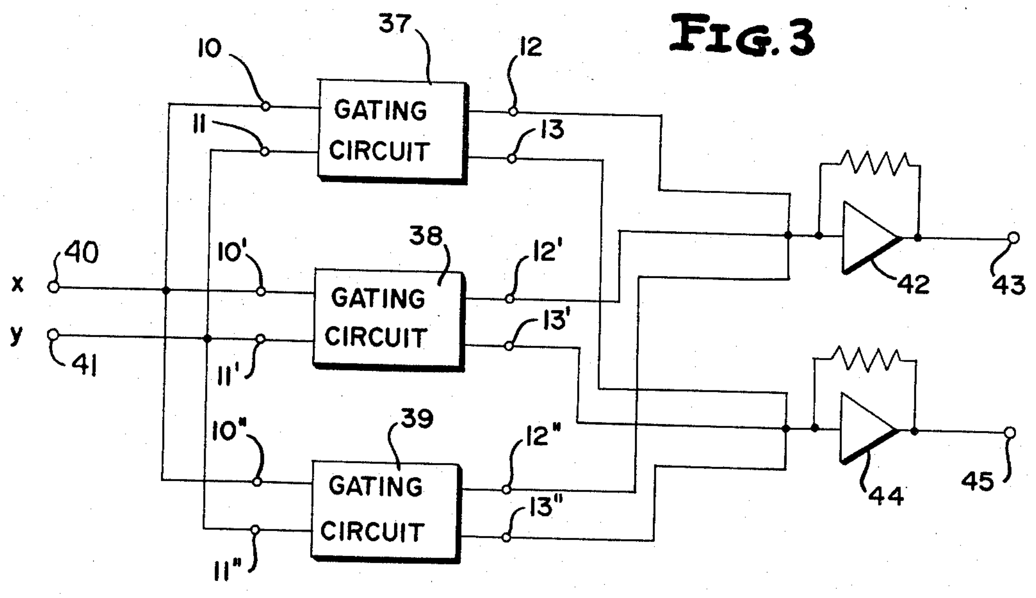
FIGURE 3 is a partial schematic circuit diagram of a square-law function generator embodying circuits such as are illustrated in FIGURE 1.

It will be seen therefore that the break-point is determined by the values of the resistors 14, 15 and 20 and the voltage at the remote end of the resistor 20 and that the slope is determined by the values of the resistors 14, 15, and the shunt resistance of the first operational amplifier 42. By using three circuits in parallel, as shown in FIGURE 3, such as the ones described with reference to FIGURE 1, the characteristic described with reference to FIGURE 2 may be readily obtained.

The operation of the circuit of FIGURE 1 has been described with reference to positive values of the sum of the input voltages, when an output is obtained at the terminal 12. When the sum of the input voltages is negative the break-point is determined by the values of the resistors 14, 15 and 26 and the voltage at the remote end of the resistor 26 and the slope is determined by the values of the resistors 14, 15 and the shunt resistance of the second operational amplifier 44. In a practical device, the shunt resistance of the operational amplifiers is fixed and for the positive and negative break-points the potentials at the remote end of the resistors 20 and 26 respectively are adjusted by a set of fixed taps along the potential dividers 21 and 27. The input $y$ to the terminal 11 is then made zero and the resistor 20 is adjusted to obtain the required break-point. Then the resistance of the resistor 14 is adjusted to obtain the required slope and the resistor 20 is re-adjusted to correct the disturbed break-point. Then the input $x$ to the terminal 10 is made zero and the resistance of the resistor 15 is adjusted to obtain the required slope for input voltages $y$ applied to the terminal 11. Finally the resistance of the resistor 26 is adjusted for the break-point for negative values of the sum of the input voltages $(x+y)$.

The foregoing description has been oversimplified in two respects. Firstly, the forward voltage drop across the diodes have been neglected and secondly, the trimming procedure is preferably carried out at points a little above the break-point and a little below the intended next break-point, to minimize errors due to the segmentation of the curve. It is necessary only to carry out adjustments every third or fourth segment, as manufacturing tolerances in resistors can be permitted in the interpolated segments.

It will be seen then that a function generator of the type described will have the following advantages:

The junction point 16 either goes to ground, through the diodes 18 or 24, or to the summing junction of an operational amplifier which is a virtual ground, apart from a small but necessary excursion of about ±0.5 volt determined by the forward voltage drop across a diode. Thus the impedance seen at the input terminals 10 and 11 is very nearly constant, and it is not necessary to generate the input voltage $x$ and $y$ by extremely lowimpedance sources as it would be if they faced a variable load.

The same input resistors 14 and 15 are used for positive and negative values of the sum of the input voltages, and hence for operation in all four quadrants. Thus, the conductance of the input load is halved.

Similarly, the same pair of potential divider chains 21 and 27 can be used for all the constituent circuits.

The leakage of the diodes 19 and 25 is only that seen at 0.5 volt peak inverse voltage. The leakage of general-purpose silicon diodes is for this purpose sufficiently small.

No diode is subjected to more than 0.5 volt peak inverse voltage; at higher values of peak inverse voltage, diode capacitance changes appreciably and this may affect the frequency-response of the function generator.

All the precision resistors except those in the two potential divider chains are standardized in a narrow range, typical values being 1 megohm for resistors 14, 15, 20, 26 for break-points below 100 volts.

Figure 4:
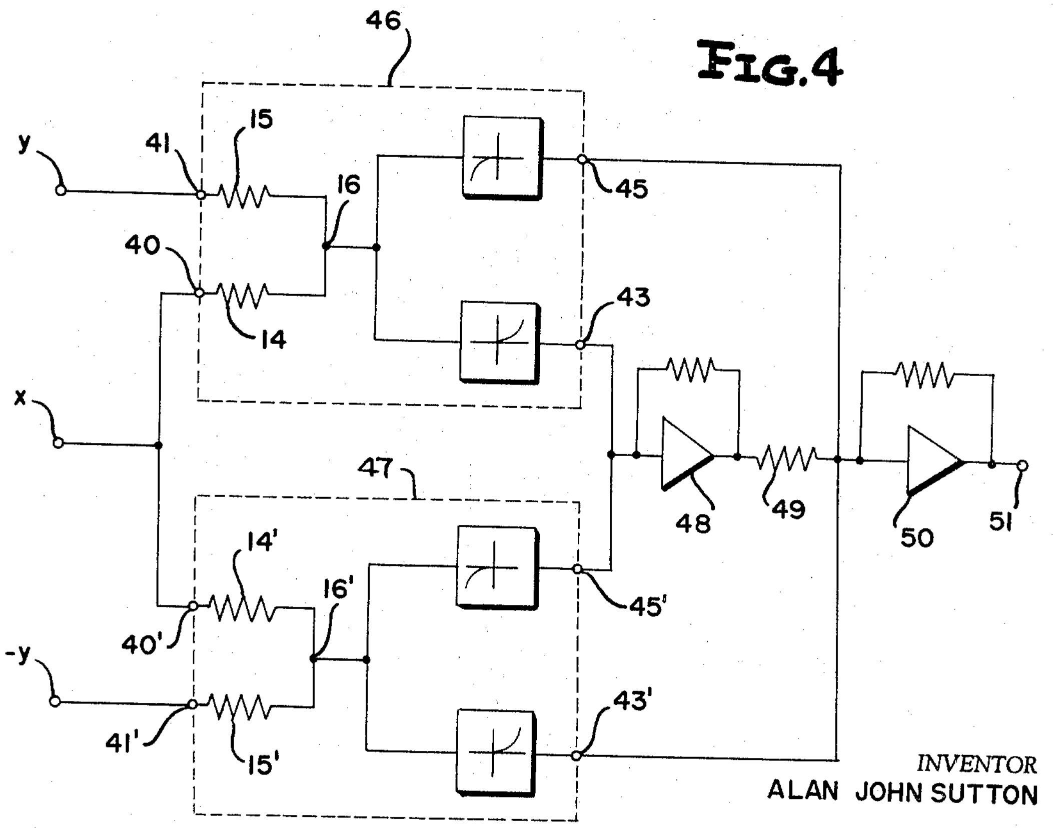
FIGURE 4 is a partial schematic circuit diagram of a quarter-square multiplier embodying function generators such as are illustrated in FIGURE 1.

In FIGURE 4 there is shown a quarter square multiplier embodying function generators of the type described.

In the drawing there are shown two function generators within the broken lines 46 and 47. Each of these generators 46, 47 is made up of a plurality of circuits of the type described with reference to FIGURE 1, connected in parallel as shown in FIGURE 3.

An input voltage $x$ is applied to the terminals 40 and 40' of the generators 46 and 47 and an input voltage $y$ is applied to the terminal 41 of the generator 46. The voltage $y$ is further applied to an amplifier (not shown) having a gain of $-1$ and the output from the amplifier, the function $-y$, is applied to the terminal 41' of the function generator 47. The current at the junction point 16 in the generator 46 is equal to the sum $$\left(\frac{x}{R_2}+\frac{y}{R_3}\right)$$

and the current at the point 16' in the generator 47 is equal to the sum $$\left(\frac{x}{R_2}-\frac{y}{R_3}\right)$$

The diagram also shows symbolically the two quadrants in which the two function generators produce an output.

The outputs from the terminal 43 of the generator 46 and the terminal 45' of the generator 47 are applied to the summing junction of an operational amplifier 48 having a negative gain. The output from the amplifier 48 is applied through a resistor 49 to further operational amplifier 50 together with the outputs from the terminal 45 of the generator 46 and the terminal 43' of the generator 47. Provided that the generators 46 and 47 are adjusted to have square-law caracteristics, the outputs from terminals 43 and 45 of the generator 46 will be proportional to $(x+y)^2$, an output appearing at terminal 43 when $(x+y)$ is greater than zero and an output appearing at terminal 45 when $(x+y)$ is less than zero. Similarly, the outputs from terminals 43' and 45' of the generator 47 will be proportional to $(x+y)^2$. Furthermore, provided that the resistor 49 is of such a value as to make the current gain, from either of the two inputs to the amplifier 48 to the input of the amplifier 50 equal to $-1$, this completes the formation in all four quadrants of $$(x+y)^2-(x-y)^2$$

one quarter of which is equal to the product $xy$. The product $xy$ of the input voltages, therefore, appears at the terminal 51. The overall voltage gain of the amplifier 50 is arbitrary, it may, for example, be made equal to ¼.

While I have described and illustrated one specific embodiment of my invention, it will be clear that variations of the details of construction which are specifically illustrated and described may be resorted to without departing from the true spirit and scope of the invention as defined in the appended claims.

I claim:

1. A gating circuit for providing selective coupling between an input voltage source and an output load only after the input voltage reaches a predetermined break-point, comprising:

a point of substantially constant reference voltage;

a variable source of bias voltage;

a junction point;

means providing a unidirectional flow of current between said point of reference voltage and said source of said voltage via said junction point;

means connecting said input voltage source to said junction point to provide current flow between said input voltage source and said junction point, said break-point occurring when said current flowing between said input voltage source and said junction point equals said unidirectional flow of current; and means connecting said junction point to said output load to provide current flow between said junction point and said load only after said input voltage reaches said break-point.

2. A gating circuit for providing selective coupling between an input voltage source and an output load only after the input voltage reaches a predetermined magnitude comprising: a point of substantially constant reference voltage; a variable source of bias voltage; a junction point; first circuit means providing a unidirectional flow of current between said point of reference voltage and said source of bias voltage via said junction point; second circuit means connecting said junction point to said output load; and third circuit means connecting said input voltage source to said junction point, the circuit parameters of said first circuit means and said third circuit means and said bias voltage determining the predetermined voltage magnitude.

3. A gating circuit for selectively coupling an input voltage source to a load for providing an output voltage function of predetermined slope at the load only after the input voltage reaches a predetermined break-point, comprising: a point of substantially constant reference voltage; a variable source of bias voltage; a junction point; first circuit means providing a flow of current between said point of reference voltage and said source of bias voltage via said junction point; second circuit means connecting said input voltage source to said junction point to provide current flow between said input voltage source and said junction point, the circuit parameters of said first circuit means and said second circuit means and said bias voltage determining said break-point; and third circuit means connecting said junction point to said output load to provide said output voltage function at said load, the circuit parameters of said second circuit means and said load determining said slope.

4. The gating circuit of claim 3 wherein said first circuit means comprises:

a first diode being connected between said point of reference voltage and said junction point; and a first resistor connected between said junction point and said source of bias voltage.

5. The gating circuit of claim 4 wherein said second circuit means comprises:

a second diode and a second resistor being connected in series between said junction point and said input voltage source, the resistances of said first and second resistors at least partially determining said break-point.

6. The gating circuit of claim 5 wherein said third circuit means comprises:

a third diode being connected between said junction point and said output load.

7. A gating circuit comprising:

a point of substantially constant reference voltage;

a junction point;

an input terminal;
a first diode and second diode;
means connecting the first diode between said point of reference voltage and said junction point;
a first resistor;
means connecting said first resistor and said second diode in series between said input terminal and said junction point;
a variable source of bias voltage;
a second resistor connected between said source of bias voltage and said junction point;
an output terminal; and
means connecting said output terminal to said junction point.

8. A gating circuit as claimed in claim 7, wherein said means connecting said output terminal to said junction point comprises:
a third diode connected between said junction point and said output terminal.

9. A gating circuit comprising:
a point of substantially constant reference voltage;
a junction point;
a first diode and
a second diode, each having an anode and a cathode;
means connecting the anode of said first diode to said point of reference voltage;
means connecting the cathode of said first diode and the cathode of said second diode to said junction point;
an input terminal;
a first resistor coupling said input terminal to the anode of said second diode;
a source of negative voltage;
a second resistor coupling said source of negative voltage to said junction point; and
an output terminal coupled to said junction point.

10. A gating circuit as claimed in claim 9, further comprising:
a third diode having an anode and a cathode, said anode being connected to said junction point and said cathode being connected to said output terminal.

11. A gating circuit comprising:
a point of constant reference voltage;
a junction point;
a first diode and
a second diode, each having an anode and a cathode;
means connecting the cathode of said first diode to said point of reference voltage;
means connecting the anodes of said first and second diodes to said junction point;
an input terminal;
a first resistor coupling said input terminal to the cathode of said second diode;
a variable source of positive voltage;
a second resistor coupling said source of positive voltage to said junction point; and
an output terminal coupled to said junction point.

12. A gating circuit as claimed in claim 11, further comprising:
a third diode having an anode and a cathode, said cathode being connected to said junction point and said anode being connected to said output terminal.

13. A gating circuit for selectively coupling the sum of two input voltages to a first load only after the sum attains a first predetermined break-point and to a second load only after the sum attains a second predetermined break-point, comprising: means for summing the two input voltages; a point of reference voltage; a source of negative voltage; a source of positive voltage; a first junction point; a second junction point; first circuit means providing a flow of current from said point of reference voltage, through said first junction point to said source of negative voltage; second circuit means providing a flow of current from said source of positive voltage, through said second junction point to said point of reference voltage; third circuit means connecting said summing means to said first and said second junction points, the circuit parameters of said first circuit means, the voltage provided by said source of negative voltage and said summing means determining said first break-point, the circuit parameters of said second circuit means, the voltage provided by said source of positive voltage and said summing means determining said second break-point; fourth circuit means connecting said first junction point to said first load, and fifth circuit means connecting said junction point to said second load.

14. The gating circuit of claim 13 wherein said first circuit means comprises:
a first diode having an anode and a cathode, said anode being connected to said point of reference voltage and said cathode being connected to said first junction point; and
a first resistor connected between said first junction point and said source of negative voltage; and
said second circuit means comprises:
a second diode having an anode and a cathode, said cathode being connected to said point of reference voltage and said anode being connected to said second junction point; and
a second resistor connected between said second junction point and said source of positive voltage.

15. The gating circuit of claim 14 wherein said summing means comprises:
a third and a fourth resistor connected in series between said two input voltages, the junction between said third and fourth resistors serving as the output of said summing means.

16. The gating circuit of claim 15 wherein said third circuit means comprises:
a third diode and a fourth diode, each having a cathode and an anode, the cathode of said third diode being connected to said first junction point and the anode of said fourth diode being connected to said second junction point, the anode of said third diode and the cathode of said fourth diode being connected together and to said output of said summing means.

17. The gating circuit of claim 16 wherein said fourth circuit means comprises:
a fifth diode having an anode and a cathode, said anode being connected to said first junction point and said cathode being connected to said first load, and said fifth circuit means comprises:
a sixth diode having an anode and a cathode, said cathode being connected to said second junction point and said anode being connected to said second load.

18. The gating circuit of claim 17 wherein the ratio of the sum voltage appearing at said first load to the sum of said input voltages has a first predetermined slope and the ratio of the sum voltage appearing at said second load to the sum of said input voltages has a second predetermined slope, said third and fourth resistors and said first load determining said first slope, and said third and fourth resistors and said second load determining said second slope.

19. The gating circuit of claim 15 wherein the resistances of said first, third and fourth resistors determines said first break-point and wherein the resistances of said second, third and fourth resistors determines said second break-point.

20. A gating circuit comprising: a point of reference voltage; first, second and third junction points; first, second, third and fourth diodes, each having an anode and a cathode; means connecting the anode of said first diode and the cathode of said second diode to said point of reference voltage; means connecting the cathodes of said first and third diodes to said first junction point; means connecting the anodes of said second and fourth diodes to said second junction point; means connecting the anode of said third diode ad the cathode of said fourth diode to said third junction point; first and second input terminals;

a first resistor coupling said first input terminal to said third junction point; a second resistor coupling said second input terminal to said third junction point; a source of negative voltage; a source of positive voltage; a third resistor coupling said source of negative voltage to said first junction point; a fourth resistor coupling said source of positive voltage to said second junction point; a first output terminal coupled to said first junction point; a second output terminal coupled to said second junction point; a fifth diode and a sixth diode, each having an anode and a cathode; the anode of said fifth diode being connected to said first junction point and the cathode of said fifth diode being connected to said first output terminal; and the cathode of said sixth diode being connected to said second junction point and the anode of said sixth diode being connected to said second output terminal.

21. An analog function generator comprising: a plurality of gating circuits connected in parallel, each of said plurality of gating circuits selectively coupling the sum of the same two input voltages to a first common output terminal only after the sum reaches a first predetermined break-point and to a second common output terminal only after the sum reaches a second predetermined break-point, each of said gating circuits comprising: means for summing the two input voltages; a point of reference voltage; a source of negative voltage; a source of positive voltage; a first junction point; a second junction point; first circuit means providing a flow of current from said point of reference voltage and through said first junction point to said source of negative voltage; second circuit means providing a flow of current from said source of positive voltage and through said second junction point to said point of reference voltage; third circuit means connecting said means for summing to said first and said second junction points, the circuit parameter of said first circuit means, the potential of the negative voltage source and said means for summing determining said first break-point, the circuit parameters of said second circuit means, the potential of the positive voltage source and said summing means determining said second break-point; fourth circuit means connecting said first junction point to said first common output terminal; and fifth circuit means connecting said second junction point to said second common output terminal.

22. An analog function generator according to claim 21 wherein the sources of positive and negative voltage for each of the parallel gating circuits are derived from common positive and negative voltage dividers, respectively.

23. An analog function generator according to claim 21, wherein said fourth circuit permits current flow to said first output terminal only when the sum of said input voltages is of one polarity and wherein said fifth circuit permits current flow to said second output only when the sum of said input voltages is of opposite polarity to that of said one polarity.

References Cited

UNITED STATES PATENTS

| | | | |
|---|---|---|---|
| 3,031,143 | 4/1962 | McCoy et al. | 235—194 |
| 3,253,135 | 5/1966 | Collings et al. | 235—194 |
| 3,277,318 | 10/1966 | Bedford | 235—197 X |
| 3,289,089 | 11/1966 | Linder. | |

MALCOLM A. MORRISON, *Primary Examiner.*

J. F. RUGGIERO, *Assistant Examiner.*